(12) United States Patent
Zhang et al.

(10) Patent No.: US 11,914,127 B2
(45) Date of Patent: Feb. 27, 2024

(54) CAMERA APPARATUS

(71) Applicant: Zhejiang Sunny Optics Co., Ltd, Yuyao (CN)

(72) Inventors: Kaiyuan Zhang, Yuyao (CN); Yi Zhang, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 475 days.

(21) Appl. No.: 17/121,132

(22) Filed: Dec. 14, 2020

(65) Prior Publication Data

US 2021/0191093 A1 Jun. 24, 2021

(30) Foreign Application Priority Data

Dec. 19, 2019 (CN) .......................... 201911317865.X

(51) Int. Cl.
*G02B 9/64* (2006.01)
*G02B 17/08* (2006.01)

(52) U.S. Cl.
CPC ........... *G02B 17/0808* (2013.01); *G02B 9/64* (2013.01)

(58) Field of Classification Search
CPC ............... G02B 17/08; G02B 17/0804; G02B 17/0808; G02B 17/0812; G02B 17/0816;

(Continued)

(56) References Cited

U.S. PATENT DOCUMENTS 3,529,888 A * 9/1970 Buchroeder ....... G02B 17/0856
359/686
4,061,420 A * 12/1977 Kaprelian .......... G02B 17/0808
359/729

(Continued)

FOREIGN PATENT DOCUMENTS

| CN | 101201450 A | 6/2008 |
| CN | 106772934 A | 5/2017 |

(Continued)

OTHER PUBLICATIONS

Kai Jiang et al., Design of Catadioptric Middle Infrared Continuous Zoom Lens for Uncooled Infrared Detector, 2011, pp. 1-9 [online] , [retrieved Feb. 21, 2023], retrieved from the Internet <URL: https://www.spiedigitallibrary.org/conference-proceedings-of-spie>. (Year: 2011).*

(Continued)

*Primary Examiner* — Ephrem Z Mebrahtu
*Assistant Examiner* — Wesley Scott Ashton
(74) *Attorney, Agent, or Firm* — Barnes & Thornburg LLP

(57) ABSTRACT

The present disclosure discloses a camera apparatus including a first optical system and a second optical system. The second optical system includes a secondary reflecting mirror, a main reflecting mirror with an opening in a center area thereof, and a lens group, which are sequentially arranged from an object side to an image side. Light from the object side is sequentially reflected by the main reflecting mirror and the secondary reflecting mirror, and then enters the lens group through the opening. A total effective focal length F1 of the first optical system and a total effective focal length F2 of the second optical system satisfy: F2/F1>10.

16 Claims, 8 Drawing Sheets

(58) Field of Classification Search
CPC .............. G02B 17/082; G02B 17/0824; G02B 17/0828; G02B 17/0832; G02B 17/0836; G02B 17/084; G02B 17/0844; G02B 17/0848; G02B 17/0852; G02B 17/0856; G02B 17/086; G02B 17/0864; G02B 17/0868; G02B 17/0872; G02B 17/0876; G02B 17/088; G02B 17/0892; G02B 17/0896; G02B 9/12; G02B 9/34; G02B 9/60; G02B 9/62; G02B 9/64; G02B 13/0005; G02B 13/001; G02B 13/0015; G02B 13/002; G02B 13/0025; G02B 13/003; G02B 13/0035; G02B 13/004; G02B 13/0045; G02B 13/005; G02B 13/0055; G02B 13/006; G02B 13/0065; G02B 13/007; G02B 13/0075; G02B 13/008; G02B 13/0085; G02B 13/009; G02B 13/0095; G02B 15/02; G03B 30/00
See application file for complete search history.

(56) References Cited

U.S. PATENT DOCUMENTS

| | | | | |
|---|---|---|---|---|
| 4,971,428 | A * | 11/1990 | Moskovich | G02B 15/143103 359/676 |
| 5,114,238 | A * | 5/1992 | Sigler | G02B 17/0856 359/728 |
| 5,159,495 | A * | 10/1992 | Hamblen | G02B 17/0808 359/736 |
| 5,161,051 | A * | 11/1992 | Whitney | G02B 17/0852 359/357 |
| 5,940,222 | A * | 8/1999 | Sinclair | G02B 17/0852 359/689 |
| 10,261,297 | B2 * | 4/2019 | Cappiello | G02B 7/182 |
| 2005/0205784 | A1 * | 9/2005 | Korniski | G01J 3/02 250/330 |
| 2013/0010180 | A1 * | 1/2013 | Hatakeyama | G02B 17/0856 348/360 |
| 2013/0063650 | A1 * | 3/2013 | Kajiyama | G02B 13/18 348/E5.045 |
| 2015/0362718 | A1 * | 12/2015 | Dam | G01J 3/2823 359/326 |
| 2019/0187446 | A1 * | 6/2019 | Dai | G02B 13/0055 |
| 2019/0265446 | A1 * | 8/2019 | Cho | G02B 17/0808 |
| 2019/0265449 | A1 * | 8/2019 | Cho | G02B 27/0025 |
| 2019/0369374 | A1 * | 12/2019 | Forcht | G02B 27/0025 |
| 2022/0075162 | A1 * | 3/2022 | Zhang | G02B 13/02 |

FOREIGN PATENT DOCUMENTS

| | | |
|---|---|---|
| CN | 106772963 A | 5/2017 |
| CN | 106990517 A | 7/2017 |
| CN | 206920684 A | 1/2018 |
| CN | 107942480 A | 4/2018 |
| CN | 108333719 A | 7/2018 |
| CN | 109597187 A | 4/2019 |
| CN | 110058389 A | 7/2019 |
| CN | 110579859 A | 12/2019 |
| CN | 211318867 U | 8/2020 |
| JP | 2013003566 A | 1/2013 |
| JP | 2018132695 A | 8/2018 |
| WO | WO-2012108137 A1 * | 8/2012 ......... G02B 17/0808 |

OTHER PUBLICATIONS

Catadioptric System Definition and Applications, 2014, pp. 1-2 [online], [retrieved Feb. 21, 2023], retrieved from the Internet <URL: https://www.azooptics.com/Article.aspx?ArticleID=668 >. (Year: 2014).*

Conor Sheil et al., Double-folded Catadioptric Lens for Smartphone Portraiture Photography, 2018, pp. 1-7 [online], retrieved Feb. 21, 2023], retrieved from the Internet <URL: https://www.spiedigitallibrary.org/conference-proceedings-of-spie>. (Year: 2018).*

F. El-Tohamy et al., A Comparative Study and Simulation of Reflecting Telescope Layouts Used in E-O Sensors of Remote Sensing Satellites, 2011, pp. 1-15 [online], [retrieved Aug. 28, 2023], retrieved from the Internet <URL: https://asat.journals.ekb.eg/article_23423_92af2369558ba86379548066248eb218.pdf>. (Year: 2011).*

Jae Heung Jo et al., Design of Omnidirectional Camera Lens System with Catadioptic System, 8788 Proceedings of SPIE 87882Q-1 to 87882Q-7 (2013). (Year: 2013).*

The Pros and Cons of Catadioptric Telescopes, 2019, pp. 1-16 [online], [retrieved Aug. 21, 2023], retrieved from the Internet <URL: https://www.highpointscientific.com/astronomy-hub/post/equipment-reviews/pros-and-cons-of-catadioptric-telescopes>. (Year: 2019).*

Machine English Translation of CN 211318867 U provided with CN 211318867 U. (Year: 2023).*

Paula Noaker Powell, Concentric Optics: Catadioptric Camera Lens is Broad-spectrum, 1998, pp. 1-3 [online], [retrieved Nov. 14, 2023], retrieved from the Internet <URL: https://www.laserfocusworld.com/optics/article/16547184/concentric-optics-catadioptric-camera-lens-is-broadspectrum>. (Year: 1998).*

Chinese Office Action for Application No. 201911317865.X, 1 page.

* cited by examiner

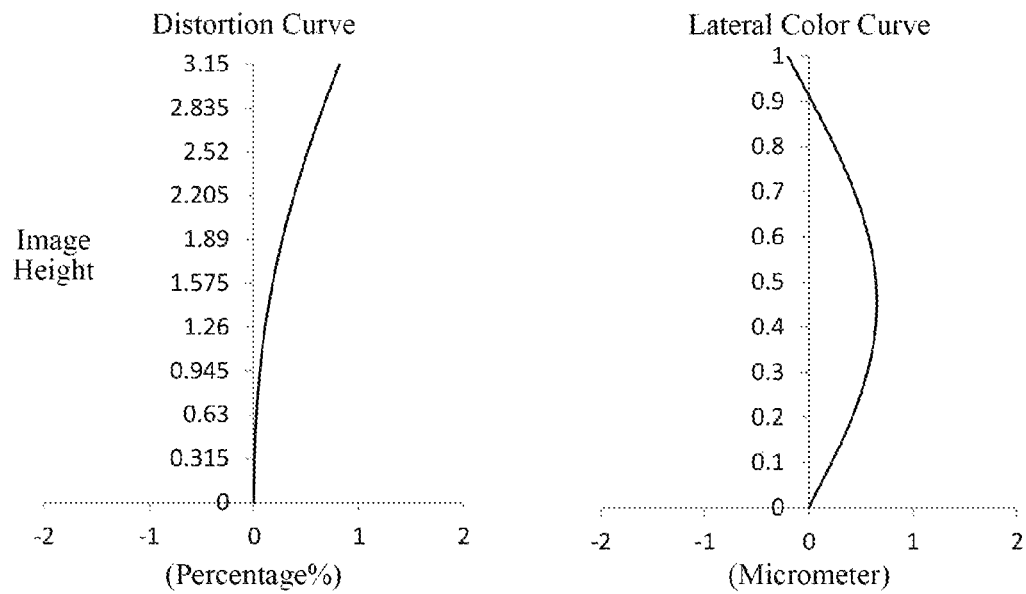
Fig. 2C
Fig. 2D
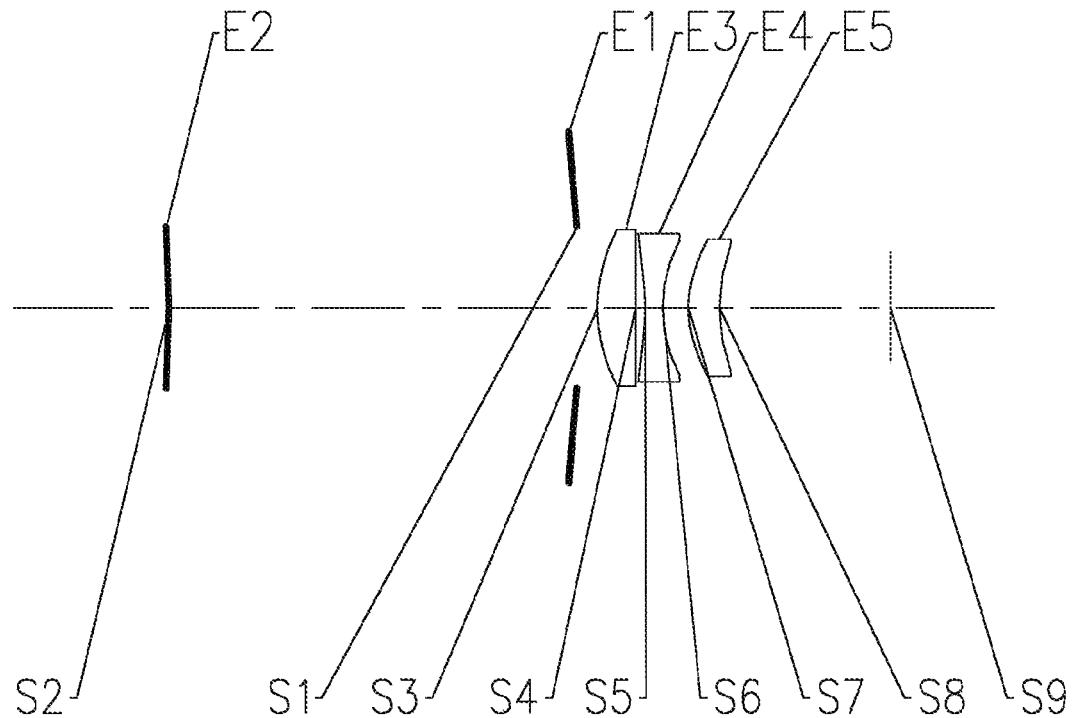
Fig. 3

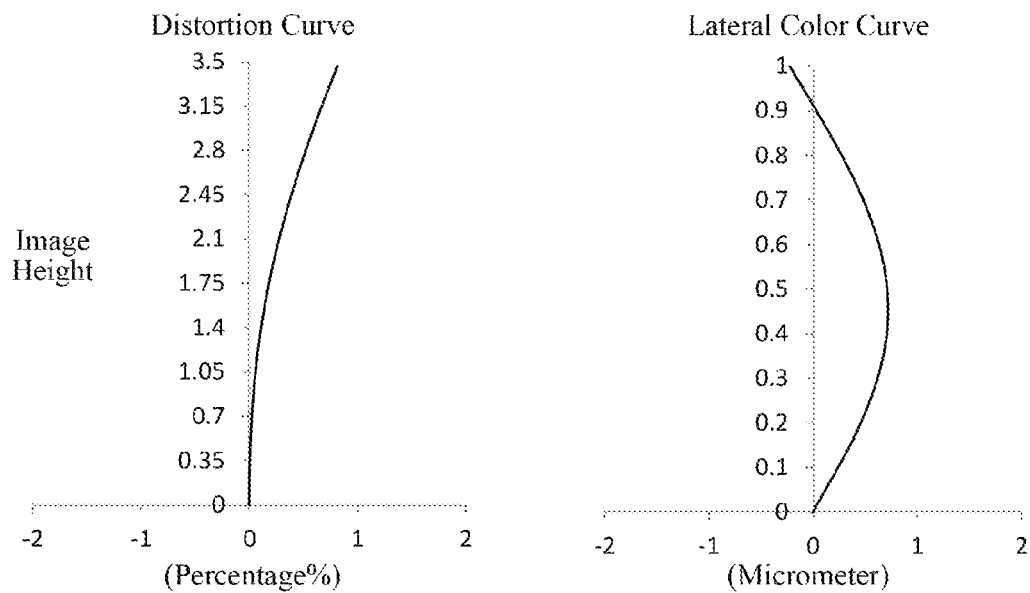
Fig. 6C
Fig. 6D
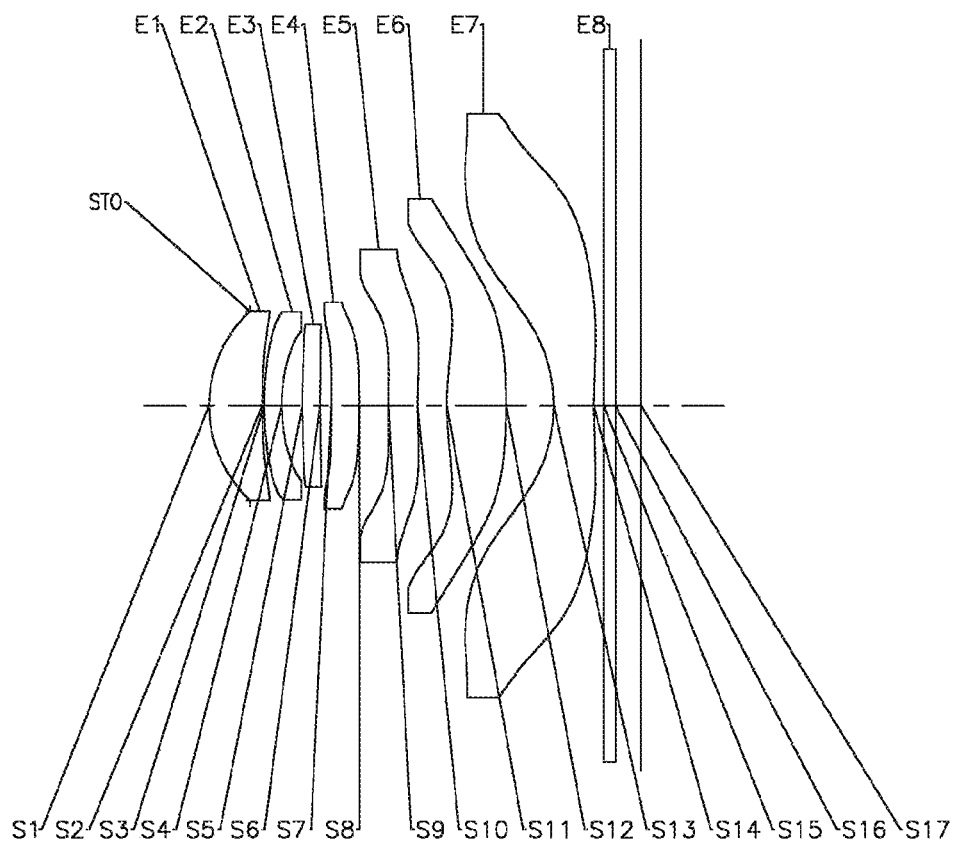
Fig. 7

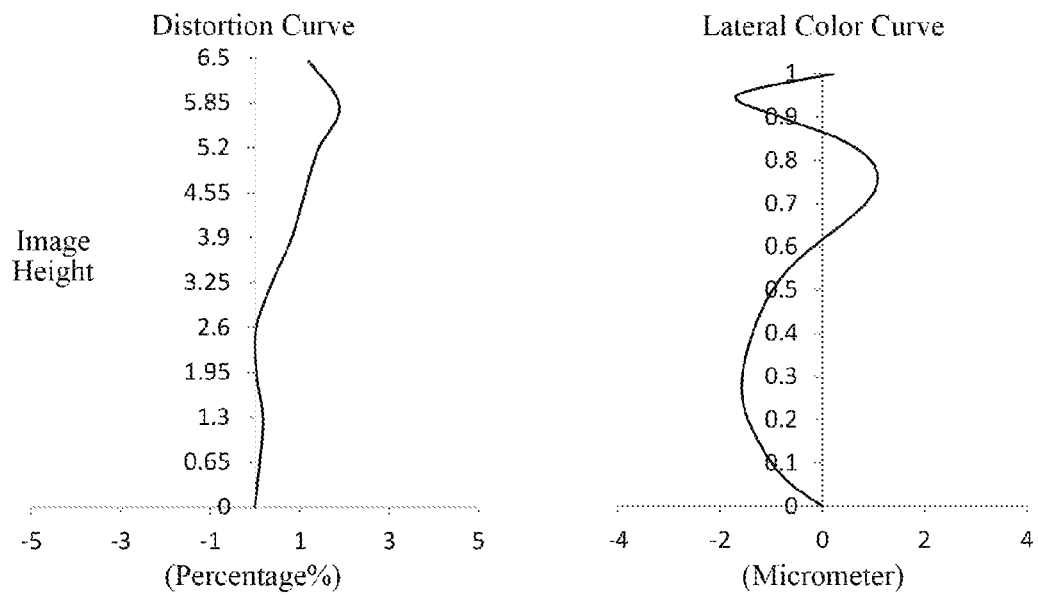
Fig. 8C
Fig. 8D
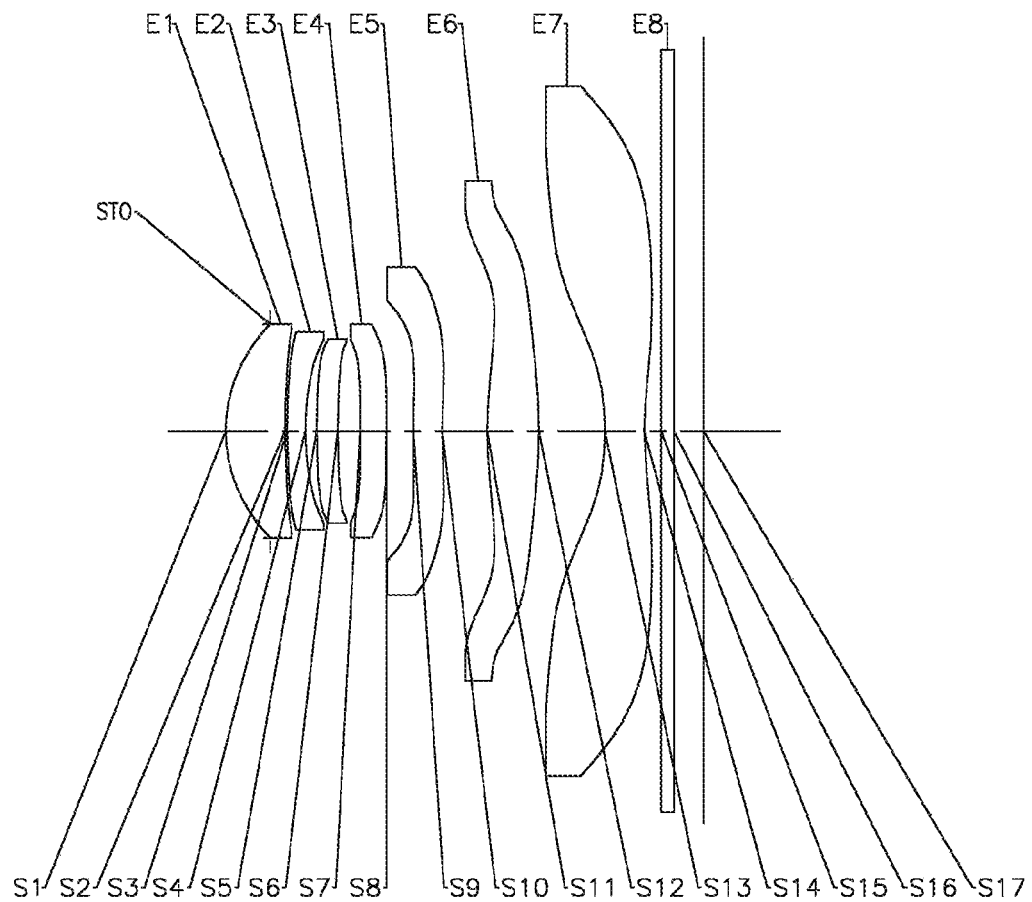
Fig. 9

CAMERA APPARATUS

CROSS-REFERENCE TO RELATED APPLICATION

This application claims benefit of priority to Chinese Patent Application No. 201911317865.X filed on Dec. 19, 2019 before the China National Intellectual Property Administration, the entire disclosure of which is incorporated herein by reference in its entity.

TECHNICAL FIELD

The present disclosure relates to the field of optical apparatuses, and specifically, relates to a camera apparatus.

BACKGROUND

With the rapid development of the industry of portable electronic products, such as smart phones, the lens assembly of the portable electronic products has also developed rapidly.

Generally speaking, users expect to be able to use the portable electronic products to complete shooting tasks in a variety of scenes, such as distant shots, close shots and even macro shots. On the other hand, users expect to obtain images with the highest possible image quality in every scene. Considering the compact internal space of the portable electronic product, the above-mentioned user requirements pose a great challenge to the design of the camera apparatus.

SUMMARY

In one aspect, the present disclosure provides a camera apparatus, which includes a first optical system and a second optical system. The first optical system includes a first lens, a second lens, a third lens, a fourth lens, a fifth lens, a sixth lens, and a seventh lens, which are sequentially arranged from an object side to an image side along an optical axis. The second optical system includes a secondary reflecting mirror, a main reflecting mirror (with an opening in the center area), and a lens group, which are sequentially arranged from an object side to an image side. Light from the object side is sequentially reflected by the main reflecting mirror and the secondary reflecting mirror, and then enters the lens group through the opening.

In one embodiment, at least one lens of the lens group has an aspheric surface.

In one embodiment, a total effective focal length F1 of the first optical system and a total effective focal length F2 of the second optical system may satisfy: $F2/F1>10$.

In one embodiment, the lens group of the second optical system includes: a first lens having positive refractive power; a second lens having negative refractive power; and a third lens having positive refractive power, which are sequentially arranged from the main reflecting mirror to the image side along the optical axis.

In one embodiment, a distance TTL2 along the optical axis from the secondary reflecting mirror of the second optical system to an imaging plane of the second optical system and a total effective focal length F2 of the second optical system may satisfy: $TTL2/F2<0.5$.

In one embodiment, an effective radius DT1 of an outer circumference of the main reflecting mirror of the second optical system and half of a diagonal length ImgH2 of an effective pixel area on an imaging plane of the second optical system may satisfy: $3.0<DT1/ImgH2<3.5$.

In one embodiment, an effective radius DT2 of the secondary reflecting mirror of the second optical system and an effective radius DT1 of an outer circumference of the main reflecting mirror of the second optical system may satisfy: $0.2<DT2/DT1<0.5$.

In one embodiment, a conic coefficient of the secondary reflecting mirror of the second optical system and a conic coefficient of the main reflecting mirror of the second optical system may both be less than $-1.0$.

In one embodiment, a distance BFL along the optical axis from an image-side surface of the third lens of the second optical system to an imaging plane of the second optical system and half of a diagonal length ImgH2 of an effective pixel area on the imaging plane of the second optical system may satisfy: $3.0<BFL/ImgH2<3.5$.

In one embodiment, a refractive index N1 of the first lens of the second optical system, a refractive index N2 of the second lens of the second optical system and a refractive index N3 of the third lens of the second optical system may satisfy: $1.5<(N1+N2+N3)/3<1.6$.

In one embodiment, a total effective focal length F2 of the second optical system and a radius of curvature R1 of the main reflecting mirror of the second optical system may satisfy: $-1.0<F2/R1<-0.5$.

In one embodiment, a total effective focal length F2 of the second optical system and a radius of curvature R2 of the secondary reflecting mirror of the second optical system may satisfy: $-1.2<F2/R2<-0.9$.

In one embodiment, a total effective focal length F2 of the second optical system and an effective focal length f1 of the first lens of the second optical system may satisfy: $4.0<F2/f1<5.0$.

In one embodiment, a total effective focal length F2 of the second optical system and an effective focal length f2 of the second lens of the second optical system may satisfy: $-8.0<F2/f2<-7.0$.

In one embodiment, a total effective focal length F2 of the second optical system and an effective focal length f3 of the third lens of the second optical system may satisfy: $3.0<F2/f3<4.0$.

In one embodiment, a distance TTL1 along the optical axis of the first optical system from an object-side surface of the first lens of the first optical system to an imaging plane of the first optical system and a total effective focal length F1 of the first optical system may satisfy: $TTL1/F1<1.2$.

In one embodiment, a total effective focal length F1 of the first optical system and half of a diagonal length ImgH1 of an effective pixel area on an imaging plane of the first optical system may satisfy: $ImgH1/F1>0.9$.

The present disclosure combines the RC reflective optical system with aspheric lenses. The above camera apparatus has at least one beneficial effect, such as small size, long focal length, compact structure, high image quality, and low distortion and the like, by rationally configuring the refractive power, the refractive index of each lens and the like. The system is used in conjunction with another optical system to form a camera apparatus, which may achieve an optical zoom factor of more than 10 times and may achieve shooting tasks in a variety of scenes.

BRIEF DESCRIPTION OF THE DRAWINGS

Other features, objects, and advantages of the present disclosure will become more apparent by reading the detailed description of the non-limiting examples with reference to the accompanying drawings:

FIGS. 2A to 2D illustrate a longitudinal aberration curve, an astigmatic curve, a distortion curve, and a lateral color curve of the second optical system of the example 1, respectively;

FIG. 3 illustrates a schematic structural view of a second optical system according to example 2 of the present disclosure;

FIGS. 6A to 6D illustrate a longitudinal aberration curve, an astigmatic curve, a distortion curve, and a lateral color curve of the second optical system of the example 3, respectively;

FIG. 7 illustrates a schematic structural view of a first optical system according to example 4 of the present disclosure;

FIGS. 8A to 8D illustrate a longitudinal aberration curve, an astigmatic curve, a distortion curve, and a lateral color curve of the first optical system of the example 4, respectively;

FIG. 9 illustrates a schematic structural view of a first optical system according to example 5 of the present disclosure.

DETAILED DESCRIPTION OF EMBODIMENTS

Figure 1:
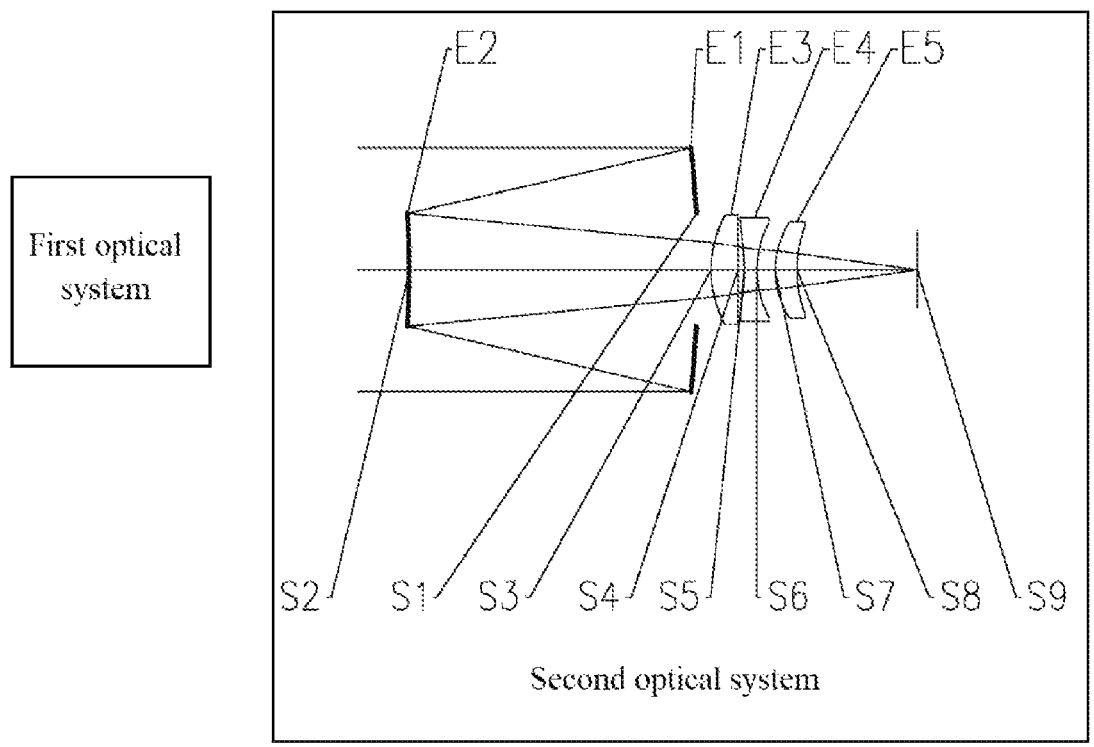
FIG. 1 illustrates a schematic structural view of a camera apparatus composed of two optical systems arranged in the direction of light travel, namely, a first optical system followed by a second optical system, wherein the second optical system is according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera apparatus according to an exemplary embodiment of the present disclosure may include, for example, a first optical system and a second optical system. The first optical system may include a first lens, a second lens, a third lens, a fourth lens, a fifth lens, a sixth lens, and a seventh lens. The first optical system is a seven-piece lens. The seven lenses are arranged sequentially from an object side to an image side along an optical axis. Among the first lens to the seventh lens, there may be a spaced interval between each two adjacent lenses. The second optical system may include a secondary reflecting mirror, a main reflecting mirror (with an opening in the center area) and a lens group, which are sequentially arranged from an object side to an image side. Light from the object side is sequentially reflected by the main reflecting mirror and the secondary reflecting mirror, and then enters the lens group through the opening of the main reflecting mirror. Among the secondary reflecting mirror to the lens group, there may be a spaced interval between each two adjacent components. The lens group includes three lenses having refractive power, which are a first lens, a second lens and a third lens. The three lenses are arranged sequentially from an object side to an image side along an optical axis. Among the first lens to the third lens, there may be a spaced interval between each two adjacent lenses.

The first optical system and the second optical system are used together, so that the optical zoom of the camera apparatus may reach more than 10 times. By configuring two reflecting mirrors to fold the optical path, the second optical system has the characteristics of ultra-long equivalent focal length and high image quality, while also meeting the requirements of small size and compact structure.

In an exemplary embodiment, the camera apparatus according to the present disclosure may satisfy: F2/F1>10, where F1 is a total effective focal length of the first optical system, and F2 is a total effective focal length of the second optical system. When F2/F1>10 is satisfied, the entire dual-camera lens group has a good zoom telephoto function.

In an exemplary embodiment, the lens group of the second optical system may include a first lens having positive refractive power, a second lens having negative refractive power, and a third lens having positive refractive power, which are sequentially arranged from the main reflecting mirror to the image side along the optical axis. By reasonably assigning the refractive power of the lenses of the second optical system, the second optical system having a long focal length may be used in conjunction with the first optical system to meet the optical zoom function of more than 10 times. At the same time, it may effectively reduce the system aberrations, so that the entire system has the characteristics of high image quality and long focal length.

In an exemplary embodiment, the camera apparatus according to the present disclosure may satisfy: TTL2/F2<0.5, where TTL2 is a distance along an optical axis from the secondary reflecting mirror of the second optical system to an imaging plane of the second optical system, and F2 is a total effective focal length of the second optical system. More specifically, TTL2 and F2 may further satisfy: TTL2/F2<0.3. When TTL2/F2<0.5 is satisfied, the ultra-long focal length characteristic of the second optical system is effectively guaranteed.

In an exemplary embodiment, the camera apparatus according to the present disclosure may satisfy: 3.0<DT1/ImgH2<3.5, where DT1 is an effective radius of an outer circumference of the main reflecting mirror of the second optical system, and ImgH2 is half of a diagonal length of an effective pixel area on an imaging plane of the second optical system. More specifically, DT1 and ImgH2 may further satisfy: 3.0<DT1/ImgH2<3.3. Satisfying 3.0<DT1/ImgH2<3.5 effectively ensures the miniaturization of combined lens assembly.

In an exemplary embodiment, the camera apparatus according to the present disclosure may satisfy: 0.2<DT2/DT1<0.5, where DT2 is an effective radius of the secondary reflecting mirror of the second optical system, and DT1 is an effective radius of an outer circumference of the main reflecting mirror of the second optical system. More specifically, DT2 and DT1 may further satisfy: 0.4<DT2/DT1<0.5. When 0.2<DT2/DT1<0.5 is satisfied, the total size of the system may be reasonably controlled, so that the system may satisfy the high requirements in performance, while also satisfying the requirements of miniaturization in structure.

In an exemplary embodiment, the camera apparatus according to the present disclosure may satisfy: K<−1.0, where K is a conic coefficient of one of the reflecting mirrors of the second optical system. When K<−1.0 is satisfied, it is ensured that the reflecting mirror surface is a hyperboloid. It should be understood that the main reflecting mirror and the secondary reflecting mirror may have different conic coefficients, but both may be less than −1.0. With two hyperboloid mirrors, it may effectively reduce the spherical aberration, field curvature, coma and other aberrations in the system, and at the same time, make the system have the characteristics of long focal length and large aperture.

In an exemplary embodiment, the camera apparatus according to the present disclosure may satisfy: 3.0<BFL/ImgH2<3.5, where BFL is a distance along the optical axis from an image-side surface of the third lens of the second optical system to an imaging plane of the second optical system, and ImgH2 is half of a diagonal length of an effective pixel area on the imaging plane of the second optical system. More specifically, BFL and ImgH2 may further satisfy: 3.0<BFL/ImgH2<3.3. Satisfying 3.0<BFL/ImgH2<3.5 makes the system more compact and miniaturized while meeting the characteristics of long focal length and high image quality.

In an exemplary embodiment, the camera apparatus according to the present disclosure may satisfy: 1.5<(N1+N2+N3)/3<1.6, where N1 is a refractive index of the first lens of the second optical system, N2 is a refractive index of the second lens of the second optical system, and N3 is a refractive index of the third lens of the second optical system. The camera apparatus satisfies the expression 1.5<(N1+N2+N3)/3<1.6. By reasonably selecting the material of the first to the third lenses, the effective focal length of the system may reach the required value, and the advantages of high image quality and small aberrations may be ensured.

In an exemplary embodiment, the camera apparatus according to the present disclosure may satisfy: −1.0<F2/R1<−0.5, where F2 is a total effective focal length of the second optical system, and R1 is a radius of curvature of the main reflecting mirror of the second optical system. More specifically, F2 and R1 may further satisfy: −0.9<F2/R1<−0.8. Satisfying −1.0<F2/R1<−0.5 (that is, controlling the shape of the main reflecting mirror while meeting the effective focal length of the system) and cooperating with the secondary reflecting mirror and other lenses may effectively correct various aberrations of the system.

In an exemplary embodiment, the camera apparatus according to the present disclosure may satisfy: −1.2<F2/R2<−0.9, where F2 is a total effective focal length of the second optical system, and R2 is a radius of curvature of the secondary reflecting mirror of the second optical system. More specifically, F2 and R2 may further satisfy: −1.2<F2/R2<−1.0. Satisfying −1.2<F2/R2<−0.9 (that is, controlling the shape of the secondary reflecting mirror while meeting the effective focal length of the system) and cooperating with the main reflecting mirror and other lenses may effectively correct various aberrations of the system.

In an exemplary embodiment, the camera apparatus according to the present disclosure may satisfy: 4.0<F2/f1<5.0, where F2 is a total effective focal length of the second optical system, and f1 is an effective focal length of the first lens of the second optical system. More specifically, F2 and f1 may further satisfy: 4.4<F2/f1<4.7. When 4.0<F2/f1<5.0 is satisfied, the contribution of the effective focal length of the first lens to the effective focal length of the total system may be effectively controlled, so that the total effective focal length of the system may reach a larger ideal value.

In an exemplary embodiment, the camera apparatus according to the present disclosure may satisfy: −8.0<F2/f2<−7.0, where F2 is a total effective focal length of the second optical system, and f2 is an effective focal length of the second lens of the second optical system. More specifically, F2 and f2 may further satisfy: −7.9<F2/f2<−7.3. When −8.0<F2/f2<−7.0 is satisfied, the contribution of the effective focal length of the second lens to the effective focal length of the total system may be effectively controlled, so that the total effective focal length of the system may reach a larger ideal value.

In an exemplary embodiment, the camera apparatus according to the present disclosure may satisfy: 3.0<F2/f3<4.0, where F2 is a total effective focal length of the second optical system, and f3 is an effective focal length of the third lens of the second optical system. More specifically, F2 and f3 may further satisfy: 3.3<F2/f3<3.6. Satisfying 3.0<F2/f3<4.0 may effectively control the contribution of the effective focal length of the third lens to the effective focal length of the total system, so that the total effective focal length of the system may reach a larger ideal value.

In an exemplary embodiment, the camera apparatus according to the present disclosure may satisfy: TTL1/F1<1.2, where TTL1 is a distance along the optical axis of the first optical system from an object-side surface of the first lens of the first optical system to an imaging plane of the first optical system, and F1 is a total effective focal length of the first optical system. When TTL1/F1<1.2 is satisfied, the long-focus characteristics of the system may be effectively guaranteed.

In an exemplary embodiment, the camera apparatus according to the present disclosure may satisfy: ImgH1/F1>0.9, where F1 is a total effective focal length of the first optical system, and ImgH1 is half of a diagonal length of an effective pixel area on an imaging plane of the first optical system. When ImgH1/F1>0.9 is satisfied, the ultra-thin characteristics of the system may be effectively guaranteed.

Optionally, the above camera apparatus may further include a stop disposed on the second lens of the second optical system. Optionally, the above camera apparatus may further include an optical filter for correcting the color deviation and/or a protective glass for protecting the photosensitive element located on an imaging plane.

The present disclosure proposes a seven-piece first optical system, a second optical system composed of an RC reflective optical system and a three-piece lens group, and a long-focus camera apparatus formed by combining the first optical system and the second optical system. By properly configuring the refractive power of each lens, the surface shape, the center thickness of each lens, the radius of curvature and spaced intervals along the optical axis between the lenses, it is possible to adopt less design freedom while ensuring that the camera apparatus has the characteristics of long focus and high resolution.

However, it will be understood by those skilled in the art that the number of lenses constituting the camera apparatus may be varied to achieve the various results and advantages described in this specification without departing from the technical solution claimed by the present disclosure. For example, although the first optical system and the second optical system are described as examples in the embodiment, the camera apparatus is not limited to including the first optical system and the second optical system. The camera apparatus may also include other numbers of optical systems if desired.

Some specific examples of a first optical system and a second optical system applicable to the camera apparatus of the above embodiment will be further described below with reference to the accompanying drawings. Examples 1 to 3 are examples of the second optical system, and examples 4 to 5 are examples of the first optical system. The following examples may be combined according to their lens group types to form 6 different camera apparatuses. The configurations of these camera apparatuses are as follows:

1) Example 1+Example 4;
2) Example 1+Example 5;
3) Example 2+Example 4;
4) Example 2+Example 5;
5) Example 3+Example 4; and
6) Example 3+Example 5.

EXAMPLE 1

A second optical system according to example 1 of the present disclosure is described below with reference to FIG. 1 to FIG. 2D. FIG. 1 shows a schematic structural view of the second optical system according to example 1 of the present disclosure.

As shown in FIG. 1, the second optical system includes a secondary reflecting mirror E2, a main reflecting mirror E1, a first lens E3, a second lens E4, a third lens E5 and an imaging plane S9, which are sequentially arranged from an object side to an image side.

The secondary reflecting mirror E2 may have a hyperboloid S2. The main reflecting mirror E1 may have a hyperboloid S1. The first lens E3 has positive refractive power, an object-side surface S3 thereof is a convex surface, and an image-side surface S4 thereof is a convex surface. The second lens E4 has negative refractive power, an object-side surface S5 thereof is a concave surface, and an image-side surface S6 thereof is a concave surface. The third lens E5 has positive refractive power, an object-side surface S7 thereof is a convex surface, and an image-side surface S8 thereof is a concave surface. Light from an object sequentially passes through the respective surfaces S1 to S8 and is finally imaged on the imaging plane S9.

Table 1 is a table illustrating basic parameters of the second optical system of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Hyperboloid | −86.2770 | −23.4036 | Reflecting mirror | | | −1.8595 |
| S2 | Hyperboloid | −67.4733 | 24.4448 | Reflecting mirror | | | −16.3235 |
| S3 (STO) | Aspheric | 8.9867 | 2.1764 | 1.55 | 72.24 | 16.39 | −5.4967 |
| S4 | Spherical | −661.7982 | 0.5319 | | | | 0.0000 |
| S5 | Aspheric | −12.5684 | 1.0112 | 1.50 | 56.41 | −9.86 | −28.0859 |
| S6 | Spherical | 8.1419 | 1.4747 | | | | 0.0000 |
| S7 | Aspheric | 6.1456 | 1.7729 | 1.59 | 68.40 | 21.88 | −4.3466 |

TABLE 1-continued

| Surface number | Surface type | Radius of curvature | Thickness/ Distance | Material Refractive index | Abbe number | Focal length | Conic coefficient |
|---|---|---|---|---|---|---|---|
| S8 | Spherical | 10.5670 | 9.7656 | | | | |
| S9 | Spherical | Infinite | | | | | |

In this example, a total effective focal length f of the second optical system is 72.94 mm, and a maximum field-of-view FOV of the second optical system is 4.9°.

In example 1, the image-side surface of any one of the first lens E3 to the third lens E5 are spherical.

In example 1, the object-side surface of any one of the first lens E3 to the third lens E5 are aspheric. The surface shape x of each aspheric lens may be defined by using, but not limited to, the following aspheric formula:

$$x = \frac{ch^2}{1 + \sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8 and A10 applicable to each aspheric surface S3, S5 and S7 in example 1.

TABLE 2

| Surface number | A4 | A6 | A8 | A10 |
|---|---|---|---|---|
| S3 | 7.5502E−04 | −1.6509E−05 | 3.0471E−07 | −2.1006E−09 |
| S5 | 5.1074E−04 | −1.1288E−05 | 9.9836E−08 | −1.4139E−10 |
| S7 | 6.9146E−04 | −1.7754E−05 | 5.8481E−07 | −8.5994E−09 |

Figures 2A, 2B:
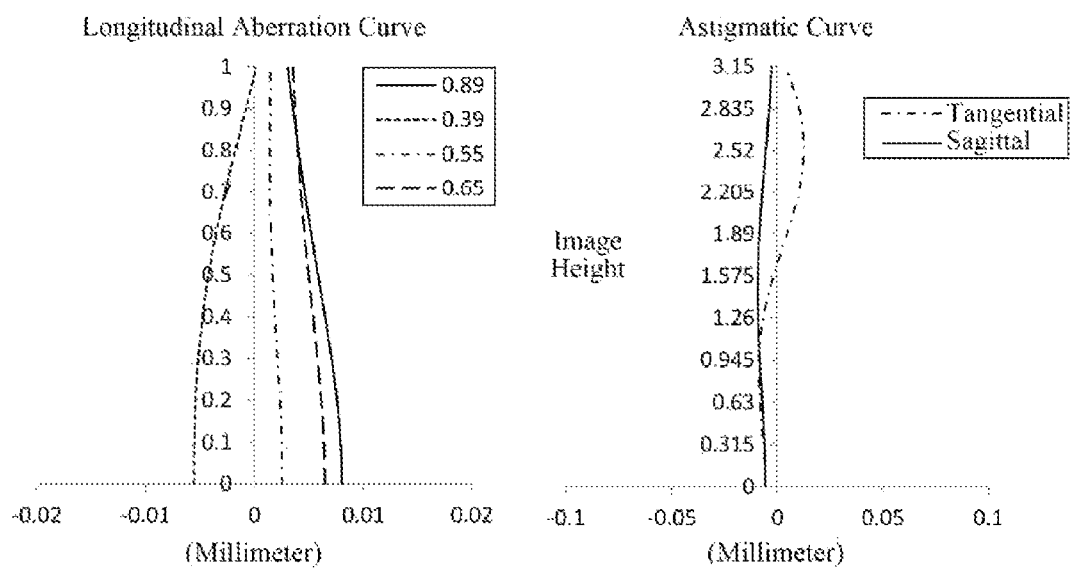

FIG. 2A illustrates a longitudinal aberration curve of the second optical system according to example 1, representing deviations of focal points converged by light of different wavelengths after passing through the optical system. FIG. 2B illustrates an astigmatic curve of the second optical system according to example 1, representing a curvature of a tangential plane and a curvature of a sagittal plane. FIG. 2C illustrates a distortion curve of the second optical system according to example 1, representing amounts of distortion corresponding to different image heights. FIG. 2D illustrates a lateral color curve of the second optical system according to example 1, representing deviations of different image heights on an imaging plane after light passes through the optical system. It can be seen from FIG. 2A to FIG. 2D that the second optical system provided in example 1 may achieve good image quality.

EXAMPLE 2

A second optical system according to example 2 of the present disclosure is described below with reference to FIG. 3 to FIG. 4D. In this example, for the purpose of brevity, the description of parts similar to those in example 1 will be omitted. FIG. 3 shows a schematic structural view of the second optical system according to example 2 of the present disclosure.

As shown in FIG. 3, the second optical system includes a secondary reflecting mirror E2, a main reflecting mirror E1, a first lens E3, a second lens E4, a third lens E5 and an imaging plane S9, which are sequentially arranged from an object side to an image side.

The secondary reflecting mirror E2 may have a hyperboloid S2. The main reflecting mirror E1 may have a hyperboloid S1. The first lens E3 has positive refractive power, an object-side surface S3 thereof is a convex surface, and an image-side surface S4 thereof is a convex surface. The second lens E4 has negative refractive power, an object-side surface S5 thereof is a concave surface, and an image-side surface S6 thereof is a concave surface. The third lens E5 has positive refractive power, an object-side surface S7 thereof is a convex surface, and an image-side surface S8 thereof is a concave surface. Light from an object sequentially passes through the respective surfaces S1 to S8 and is finally imaged on the imaging plane S9.

In this example, a total effective focal length f of the second optical system is 87.53 mm, and a maximum field-of-view FOV of the second optical system is 4.9°. The image-side surface of any one of the first lens E3 to the third lens E5 are spherical.

Table 3 is a table illustrating basic parameters of the second optical system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Hyperboloid | −103.5324 | −28.0843 | Reflecting mirror | | | −1.8595 |
| S2 | Hyperboloid | −80.9680 | 29.3337 | Reflecting mirror | | | −16.3235 |
| S3 (STO) | Aspheric | 10.7840 | 2.6117 | 1.55 | 72.24 | 18.93 | −5.4967 |
| S4 | Spherical | −794.1579 | 0.6383 | | | | 0.0000 |

TABLE 3-continued

| Surface number | Surface type | Radius of curvature | Thickness/ Distance | Material Refractive index | Material Abbe number | Focal length | Conic coefficient |
|---|---|---|---|---|---|---|---|
| S5 | Aspheric | −15.0821 | 1.2134 | 1.50 | 56.41 | −11.24 | −28.0859 |
| S6 | Spherical | 9.7702 | 1.7697 | | | | 0.0000 |
| S7 | Aspheric | 7.3747 | 2.1275 | 1.59 | 68.40 | 25.11 | −4.3466 |
| S8 | Spherical | 12.6804 | 11.7187 | | | | |
| S9 | Spherical | Infinite | | | | | |

TABLE 4

| Surface number | A4 | A6 | A8 | A10 |
|---|---|---|---|---|
| S3 | 4.3693E−04 | −6.6346E−06 | 8.5040E−08 | −4.0712E−10 |
| S5 | 2.9557E−04 | −4.5364E−06 | 2.7862E−08 | −2.7403E−11 |
| S7 | 4.0015E−04 | −7.1350E−06 | 1.6321E−07 | −1.6666E−09 |

Figure 4A:
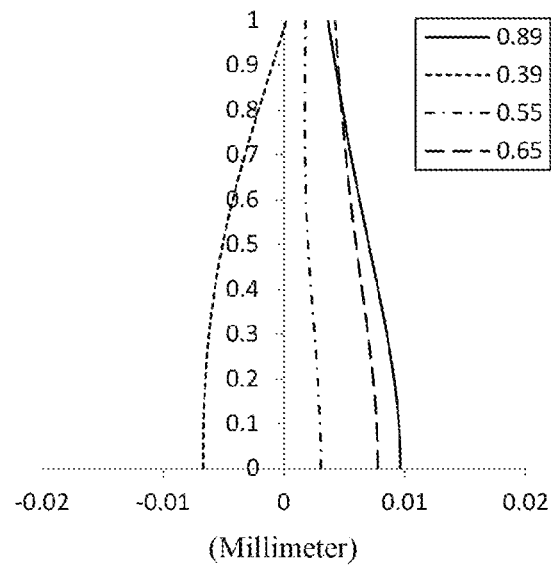
FIGS. 4A to 4D illustrate a longitudinal aberration curve, an astigmatic curve, a distortion curve, and a lateral color curve of the second optical system of the example 2, respectively.
Figure 4B:
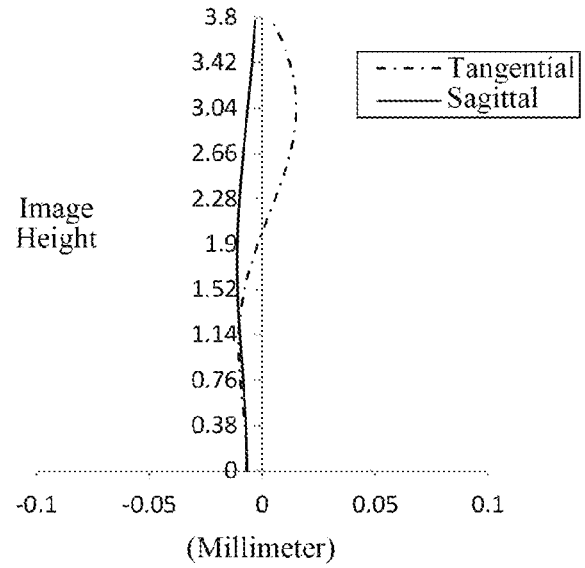
Figure 4C:
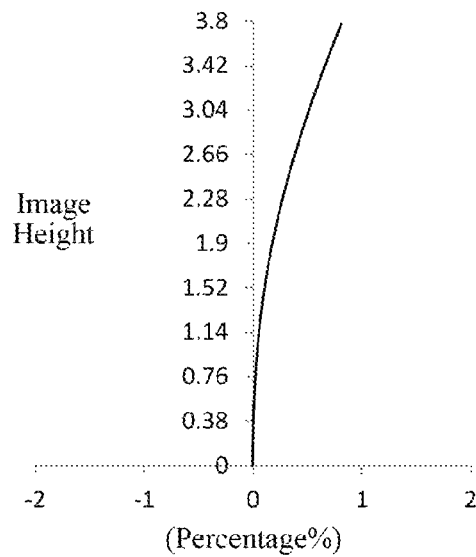
Figure 4D:
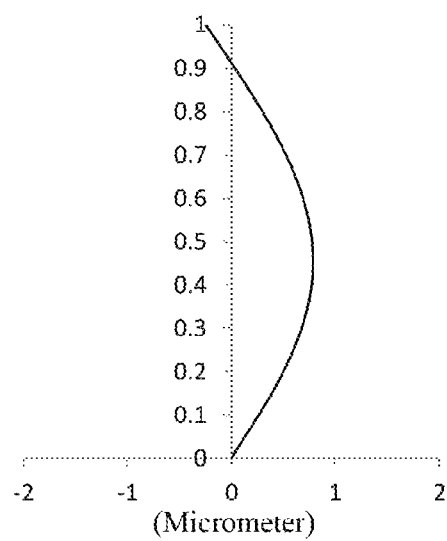

FIG. 4A illustrates a longitudinal aberration curve of the second optical system according to example 2, representing deviations of focal points converged by light of different wavelengths after passing through the optical system. FIG. 4B illustrates an astigmatic curve of the second optical system according to example 2, representing a curvature of a tangential plane and a curvature of a sagittal plane. FIG. 4C illustrates a distortion curve of the second optical system according to example 2, representing amounts of distortion corresponding to different image heights. FIG. 4D illustrates a lateral color curve of the second optical system according to example 2, representing deviations of different image heights on an imaging plane after light passes through the optical system. It can be seen from FIG. 4A to FIG. 4D that the second optical system provided in example 2 may achieve good image quality.

EXAMPLE 3

Figure 5:
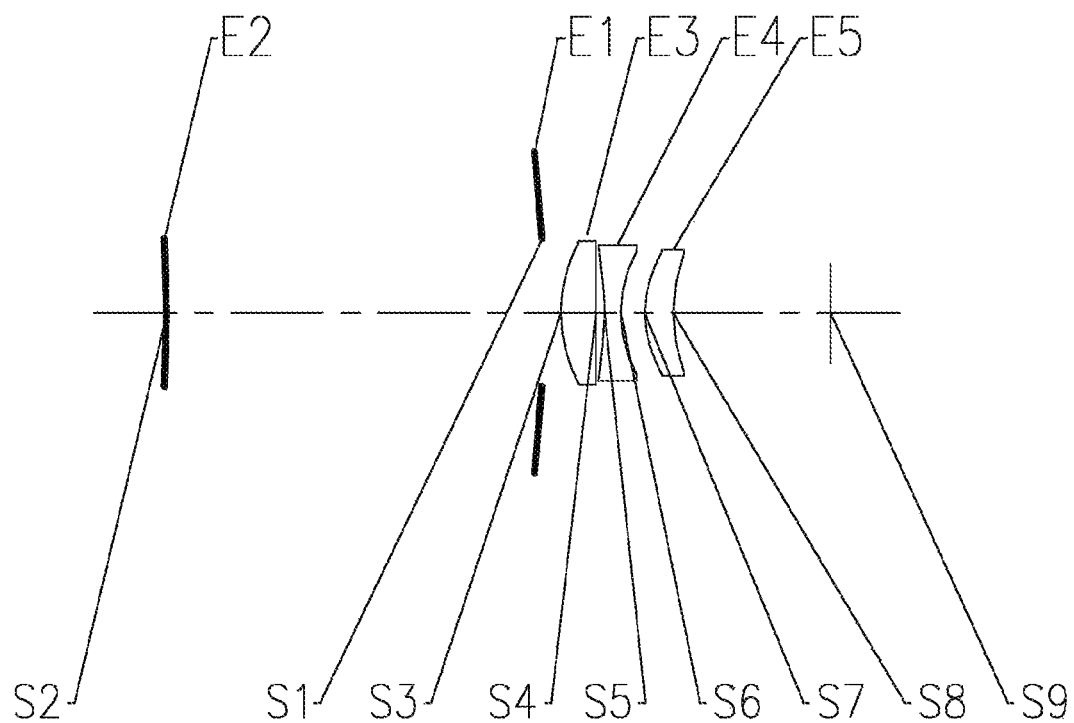
FIG. 5 illustrates a schematic structural view of a second optical system according to example 3 of the present disclosure.

A second optical system according to example 3 of the present disclosure is described below with reference to FIG. 5 to FIG. 6D. FIG. 5 shows a schematic structural view of the second optical system according to example 3 of the present disclosure.

As shown in FIG. 5, the second optical system includes a secondary reflecting mirror E2, a main reflecting mirror E1, a first lens E3, a second lens E4, a third lens E5 and an imaging plane S9, which are sequentially arranged from an object side to an image side.

The secondary reflecting mirror E2 may have a hyperboloid S2. The main reflecting mirror E1 may have a hyperboloid S1. The first lens E3 has positive refractive power, an object-side surface S3 thereof is a convex surface, and an image-side surface S4 thereof is a convex surface. The second lens E4 has negative refractive power, an object-side surface S5 thereof is a concave surface, and an image-side surface S6 thereof is a concave surface. The third lens E5 has positive refractive power, an object-side surface S7 thereof is a convex surface, and an image-side surface S8 thereof is a concave surface. Light from an object sequentially passes through the respective surfaces S1 to S8 and is finally imaged on the imaging plane S9.

In this example, a total effective focal length f of the second optical system is 80.24 mm, and a maximum field-of-view FOV of the second optical system is 4.9°. The image-side surface of any one of the first lens E3 to the third lens E5 are spherical.

Table 5 is a table illustrating basic parameters of the second optical system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Hyperboloid | −94.9047 | −25.7440 | Reflecting mirror | | | −1.8595 |
| S2 | Hyperboloid | −74.2207 | 26.8893 | Reflecting mirror | | | −16.3235 |
| S3 (STO) | Aspheric | 9.8853 | 2.3941 | 1.55 | 72.24 | 17.36 | −5.4967 |
| S4 | Spherical | −727.9781 | 0.5851 | | | | 0.0000 |
| S5 | Aspheric | −13.8252 | 1.1123 | 1.50 | 56.41 | −10.30 | −28.0859 |
| S6 | Spherical | 8.9560 | 1.6222 | | | | 0.0000 |
| S7 | Aspheric | 6.7601 | 1.9502 | 1.59 | 68.40 | 23.02 | −4.3466 |
| S8 | Spherical | 11.6237 | 10.7421 | | | | |
| S9 | Spherical | Infinite | | | | | |

TABLE 6

| Surface number | A4 | A6 | A8 | A10 |
|---|---|---|---|---|
| S3 | 5.6726E−04 | −1.0251E−05 | 1.5637E−07 | −8.9088E−10 |
| S5 | 3.8372E−04 | −7.0090E−06 | 5.1232E−08 | −5.9964E−11 |
| S7 | 5.1950E−04 | −1.1024E−05 | 3.0010E−07 | −3.6470E−09 |

Figures 6A, 6B:
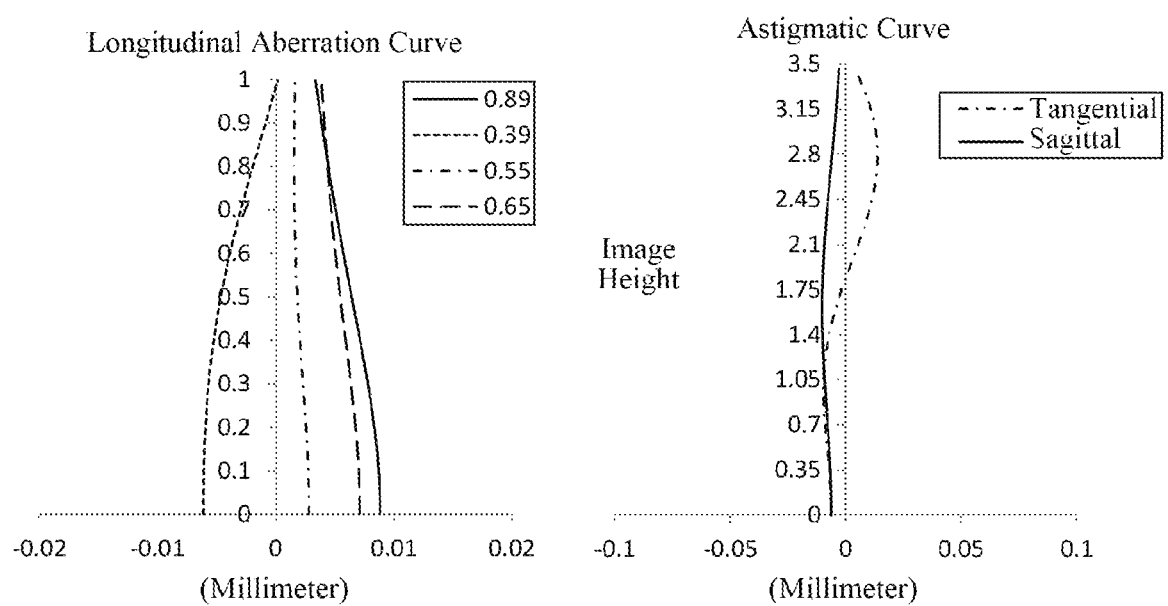

FIG. 6A illustrates a longitudinal aberration curve of the second optical system according to example 3, representing deviations of focal points converged by light of different wavelengths after passing through the optical system. FIG. 6B illustrates an astigmatic curve of the second optical system according to example 3, representing a curvature of a tangential plane and a curvature of a sagittal plane. FIG. 6C illustrates a distortion curve of the second optical system according to example 3, representing amounts of distortion corresponding to different image heights. FIG. 6D illustrates a lateral color curve of the second optical system according to example 3, representing deviations of different image heights on an imaging plane after light passes through the optical system. It can be seen from FIG. 6A to FIG. 6D that the second optical system provided in example 3 may achieve good image quality.

EXAMPLE 4

A first optical system according to example 4 of the present disclosure is described below with reference to FIG. 7 to FIG. 8D. FIG. 7 shows a schematic structural view of the first optical system according to example 4 of the present disclosure.

As shown in FIG. 7, the first optical system includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 7 is a table illustrating basic parameters of the first optical system of example 4, wherein the units for the radius of curvature, the thickness/distance and the focal length are millimeter (mm).

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7151 | | | | |
| S1 | Aspheric | 2.3174 | 0.9364 | 1.546 | 56.11 | 5.19 | 0.0263 |
| S2 | Aspheric | 10.9122 | 0.0350 | | | | 10.3469 |
| S3 | Aspheric | 5.9148 | 0.3100 | 1.678 | 19.25 | −10.79 | 9.7151 |
| S4 | Aspheric | 3.2000 | 0.3626 | | | | 2.3987 |
| S5 | Aspheric | 13.8233 | 0.3100 | 1.678 | 19.25 | 74.66 | 90.9503 |
| S6 | Aspheric | 18.8484 | 0.1978 | | | | −99.0000 |
| S7 | Aspheric | 91.6703 | 0.4959 | 1.546 | 56.11 | 41.26 | −38.9435 |
| S8 | Aspheric | −29.8027 | 0.5164 | | | | 79.3889 |
| S9 | Aspheric | 19.1537 | 0.5123 | 1.645 | 23.49 | −20.48 | 59.6526 |
| S10 | Aspheric | 7.7338 | 0.5163 | | | | −1.7482 |
| S11 | Aspheric | 5.3789 | 1.0456 | 1.546 | 56.11 | 6.48 | 0.3838 |
| S12 | Aspheric | −9.6233 | 0.8366 | | | | −9.1234 |
| S13 | Aspheric | −3.0672 | 0.7016 | 1.536 | 55.74 | −4.18 | −1.1463 |
| S14 | Aspheric | 8.9859 | 0.1797 | | | | −28.1695 |
| S15 | Spherical | Infinite | 0.2100 | 1.517 | 64.17 | | |
| S16 | Spherical | Infinite | 0.4463 | | | | |
| S17 | Spherical | Infinite | | | | | |

In this example, a total effective focal length f of the first optical system is 6.62 mm, and a maximum field-of-view FOV of the first optical system is 87.8°.

In example 4, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (2)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 8 below shows high-order coefficients A4, A6, A8, A10, A12, A14, A16, A18 and A20 applicable to each aspheric surface S1 to S14 in example 4.

TABLE 8

| Surface number | A4 | A6 | A8 | A10 | A12 |
|---|---|---|---|---|---|
| S1 | −1.2372E−03 | 7.3054E−03 | −1.3673E−02 | 1.6459E−02 | −1.2807E−02 |
| S2 | −3.0576E−03 | −1.6668E−04 | 2.3119E−02 | −4.9249E−02 | 5.2100E−02 |
| S3 | −1.2928E−02 | 9.4709E−04 | 3.0118E−02 | −6.6133E−02 | 7.3832E−02 |
| S4 | −8.4167E−03 | −1.7363E−03 | 3.3134E−02 | −8.7209E−02 | 1.3230E−01 |
| S5 | −1.5335E−02 | 5.7235E−02 | −3.1593E−02 | 7.1237E−02 | −9.2544E−02 |
| S6 | −1.1271E−02 | −1.1075E−02 | 3.8446E−02 | −8.3728E−02 | 1.1228E−01 |
| S7 | −1.8906E−02 | −2.3317E−02 | 5.9638E−02 | −1.0934E−01 | 1.2169E−01 |
| S8 | −2.3027E−02 | −1.4783E−03 | 4.7335E−03 | −1.0278E−02 | 8.5400E−03 |
| S9 | −5.1036E−02 | 1.9679E−02 | −1.0463E−02 | 3.5983E−03 | −1.0105E−03 |
| S10 | −6.0065E−02 | 2.2206E−02 | −7.8250E−03 | 1.9909E−03 | −3.9141E−04 |
| S11 | −2.6145E−02 | −5.8706E−04 | 1.7109E−03 | −8.0431E−04 | 1.9874E−04 |
| S12 | −9.1447E−04 | −5.9431E−03 | 1.7182E−03 | −2.6968E−04 | 2.6043E−05 |
| S13 | −2.3444E−02 | 2.5711E−03 | 6.2884E−04 | −1.5368E−04 | 1.4965E−05 |
| S14 | −2.2134E−02 | 3.6695E−03 | −3.0028E−04 | 5.4853E−06 | 1.0764E−06 |

| Surface number | A14 | A16 | A18 | A20 |
|---|---|---|---|---|
| S1 | 6.4084E−03 | −1.9944E−03 | 3.5053E−04 | −2.6732E−05 |
| S2 | −3.2199E−02 | 1.1754E−02 | −2.3498E−03 | 1.9811E−04 |
| S3 | −4.8466E−02 | 1.8875E−02 | −4.0346E−03 | 3.6429E−04 |
| S4 | −1.2132E−01 | 6.6837E−02 | −2.0312E−02 | 2.6311E−03 |
| S5 | 7.1662E−02 | −3.2295E−02 | 7.7706E−03 | −7.6699E−04 |
| S6 | −9.1443E−02 | 4.4544E−02 | −1.1809E−02 | 1.3013E−03 |
| S7 | −8.3008E−02 | 3.3995E−02 | −7.5574E−03 | 6.9403E−04 |
| S8 | −3.7630E−03 | 9.0962E−04 | −1.0174E−04 | 2.9338E−06 |
| S9 | 1.9385E−04 | −1.3079E−05 | −1.0824E−06 | 1.3434E−07 |
| S10 | 6.6262E−05 | −8.2700E−06 | 5.9736E−07 | −1.8039E−08 |
| S11 | −2.9562E−05 | 2.6770E−06 | −1.3440E−07 | 2.8370E−09 |
| S12 | −1.2043E−06 | −1.3067E−08 | 3.5055E−09 | −9.5188E−11 |
| S13 | −8.1821E−07 | 2.6359E−08 | −4.6946E−10 | 3.5780E−12 |
| S14 | −1.0642E−07 | 4.5550E−09 | −9.6379E−11 | 8.1094E−13 |

Figure 8A:
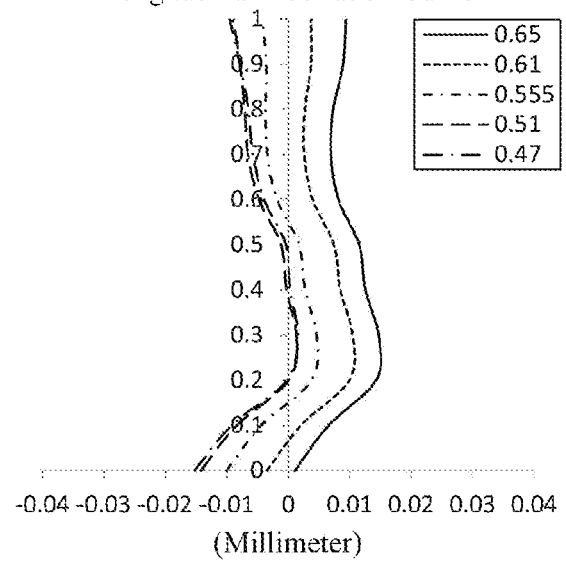
Figure 8B:
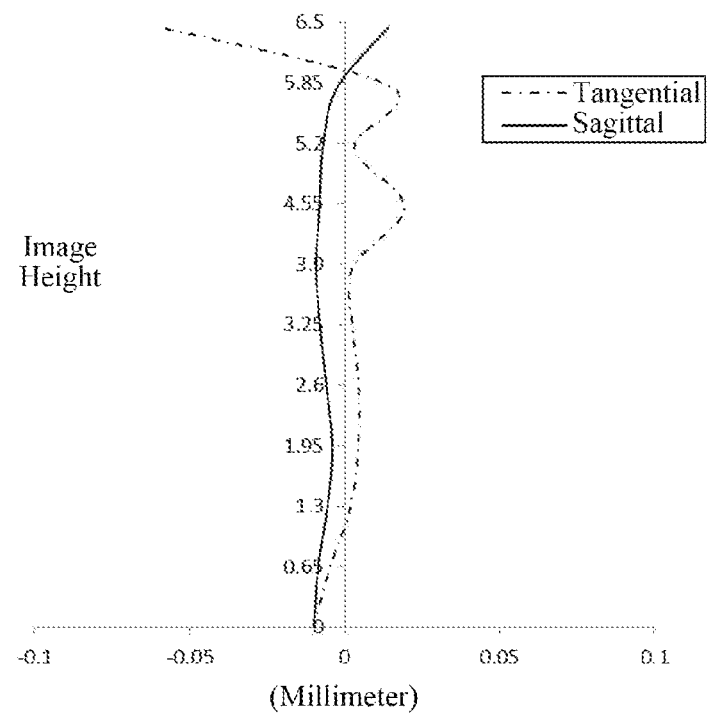

FIG. 8A illustrates a longitudinal aberration curve of the first optical system according to example 4, representing deviations of focal points converged by light of different wavelengths after passing through the optical system. FIG. 8B illustrates an astigmatic curve of the first optical system according to example 4, representing a curvature of a tangential plane and a curvature of a sagittal plane. FIG. 8C illustrates a distortion curve of the first optical system according to example 4, representing amounts of distortion corresponding to different image heights. FIG. 8D illustrates a lateral color curve of the first optical system according to example 4, representing deviations of different image heights on an imaging plane after light passes through the optical system. It can be seen from FIG. 8A to FIG. 8D that the first optical system provided in example 4 may achieve good image quality.

EXAMPLE 5

A first optical system according to example 5 of the present disclosure is described below with reference to FIG. 9 to FIG. 10D. FIG. 9 shows a schematic structural view of the first optical system according to example 5 of the present disclosure.

As shown in FIG. 9, the first optical system includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces Si to S16 and is finally imaged on the imaging plane S17.

In this example, a total effective focal length f of the first optical system is 6.85 mm, and a maximum field-of-view FOV of the first optical system is 85.5°.

Table 9 is a table illustrating basic parameters of the first optical system of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (2) given in the above example 5.

10B illustrates an astigmatic curve of the first optical system according to example 5, representing a curvature of a tangential plane and a curvature of a sagittal plane. FIG. 10C illustrates a distortion curve of the first optical system according to example 5, representing amounts of distortion

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7223 | | | | |
| S1 | Aspheric | 2.5356 | 0.9675 | 1.546 | 56.11 | 5.26 | 0.0330 |
| S2 | Aspheric | 12.1943 | 0.0350 | | | | −6.4427 |
| S3 | Aspheric | 8.3285 | 0.3000 | 1.666 | 20.4 | −13.01 | 6.6281 |
| S4 | Aspheric | 4.2297 | 0.1827 | | | | 1.5368 |
| S5 | Aspheric | 5.0485 | 0.3429 | 1.546 | 56.11 | −666.67 | −14.6424 |
| S6 | Aspheric | 9.2536 | 0.3641 | | | | 34.1015 |
| S7 | Aspheric | 61.0782 | 0.4300 | 1.666 | 20.4 | −500.00 | −99.0000 |
| S8 | Aspheric | 51.4796 | 0.4414 | | | | −99.0000 |
| S9 | Aspheric | 11.1496 | 0.4700 | 1.645 | 23.49 | −69.18 | 5.8539 |
| S10 | Aspheric | 8.7720 | 0.7363 | | | | −3.1326 |
| S11 | Aspheric | 7.1731 | 0.8408 | 1.546 | 56.11 | 7.47 | −12.2893 |
| S12 | Aspheric | −9.0683 | 1.0800 | | | | −13.9664 |
| S13 | Aspheric | −5.0125 | 0.6400 | 1.536 | 55.74 | −4.50 | −0.7279 |
| S14 | Aspheric | 4.8608 | 0.2753 | | | | −28.1872 |
| S15 | Spherical | Infinite | 0.2100 | 1.517 | 64.17 | | |
| S16 | Spherical | Infinite | 0.4839 | | | | |
| S17 | Spherical | Infinite | | | | | |

TABLE 10

| Surface number | A4 | A6 | A8 | A10 | A12 |
|---|---|---|---|---|---|
| S1 | 8.5098E−02 | −3.5122E−02 | 1.6756E−02 | −8.5459E−03 | 5.2011E−03 |
| S2 | 3.6270E−02 | −5.6464E−02 | 3.4545E−02 | 4.4092E−03 | −2.2870E−02 |
| S3 | −1.1660E−01 | −7.2716E−04 | 1.8144E−02 | −7.7704E−03 | −9.4056E−04 |
| S4 | 2.0467E−02 | −4.8404E−02 | 3.5916E−04 | 1.2100E−02 | 6.5157E−03 |
| S5 | −2.4374E−01 | 3.7291E−02 | −3.4405E−03 | −1.9955E−03 | 9.4524E−05 |
| S6 | −2.3592E−01 | 9.2749E−02 | −4.0701E−02 | 1.9913E−02 | −1.1012E−02 |
| S7 | −1.9563E−01 | −1.6697E−02 | −3.2116E−03 | −5.1881E−04 | −5.9670E−04 |
| S8 | −3.5946E−01 | 2.9270E−02 | 2.4749E−02 | 8.6791E−03 | −2.0694E−03 |
| S9 | −8.8536E−01 | 1.9735E−02 | 1.6185E−02 | 1.4505E−02 | −4.4017E−03 |
| S10 | −9.6932E−01 | 9.6506E−02 | −4.0832E−02 | −2.1075E−03 | −7.3852E−03 |
| S11 | −1.4147E+00 | 3.2622E−01 | 5.4739E−02 | −6.2351E−02 | −2.1931E−02 |
| S12 | −1.8000E−01 | −4.5397E−02 | 1.4612E−01 | −3.2705E−03 | −3.5400E−02 |
| S13 | 1.7402E+00 | 6.2567E−02 | −1.8881E−01 | 1.4519E−01 | −7.6250E−02 |
| S14 | −1.8384E+00 | 2.2601E−01 | −1.3219E−01 | 7.3591E−02 | −2.6020E−02 |

| Surface number | A14 | A16 | A18 | A20 |
|---|---|---|---|---|
| S1 | −3.1564E−03 | 1.6999E−03 | −6.9490E−04 | 1.8696E−04 |
| S2 | 2.2743E−02 | −1.4483E−02 | 5.1237E−03 | −1.1262E−03 |
| S3 | 4.3547E−03 | −4.7199E−03 | 1.9168E−03 | −5.6998E−04 |
| S4 | −2.0127E−02 | 1.6108E−02 | −6.7866E−03 | 1.2447E−03 |
| S5 | 5.4532E−04 | −4.5185E−04 | 1.4262E−04 | −2.7852E−05 |
| S6 | 5.8940E−03 | −2.6674E−03 | 8.5902E−04 | −1.3272E−04 |
| S7 | −3.1702E−04 | −2.3772E−04 | −9.2162E−05 | −3.4690E−05 |
| S8 | −3.0477E−03 | −2.1602E−03 | −8.2404E−04 | −2.2786E−04 |
| S9 | −3.3705E−03 | −1.5746E−03 | −3.1236E−04 | −4.2786E−05 |
| S10 | −3.5779E−04 | −7.4431E−04 | −3.4065E−04 | −1.1798E−04 |
| S11 | 6.5051E−03 | −2.1144E−03 | −3.9243E−03 | −5.7938E−04 |
| S12 | −9.4872E−03 | 2.3927E−04 | 1.9463E−03 | 2.7725E−03 |
| S13 | 2.8678E−02 | −7.8867E−03 | 1.5676E−03 | −1.7318E−03 |
| S14 | 1.2456E−02 | −7.1777E−03 | 8.1348E−04 | 3.4130E−04 |

Figure 10A:
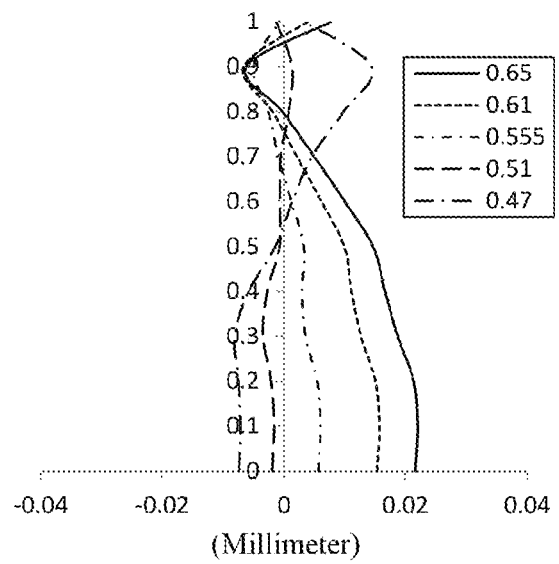
FIGS. 10A to 10D illustrate a longitudinal aberration curve, an astigmatic curve, a distortion curve, and a lateral color curve of the first optical system of the example 5, respectively.
Figure 10B:
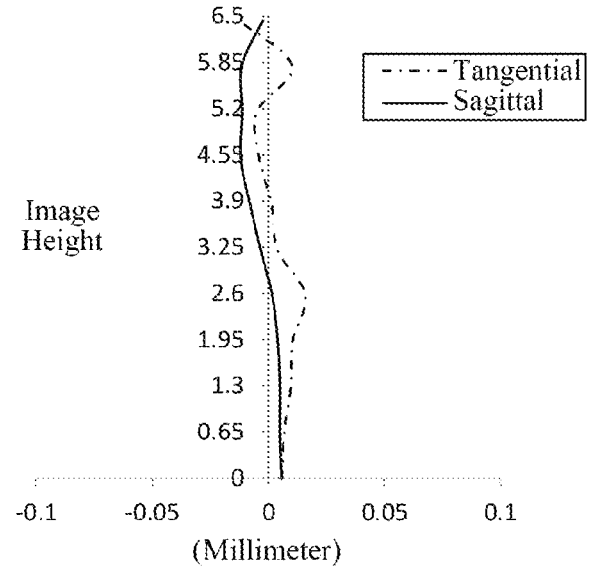
Figure 10C:
Figure 10D:
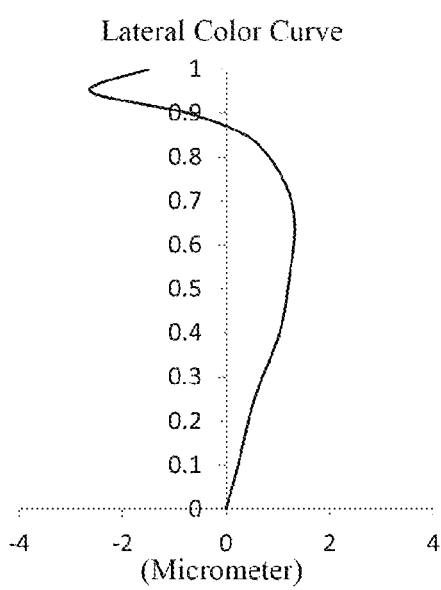

FIG. 10A illustrates a longitudinal aberration curve of the first optical system according to example 5, representing deviations of focal points converged by light of different wavelengths after passing through the optical system. FIG. corresponding to different image heights. FIG. 10D illustrates a lateral color curve of the first optical system according to example 5, representing deviations of different image heights on an imaging plane after light passes through the optical system. It can be seen from FIG. 10A to FIG. 10D that the first optical system provided in example 5 may achieve good image quality.

In view of the above, examples 1 to 5 respectively satisfy the relationship shown in Table 11.

TABLE 11

| Condition/Example | 1 | 2 | 3 | 4 | 5 |
|---|---|---|---|---|---|
| TTL2/F2 | 0.24 | 0.24 | 0.24 | | |
| DT1/ImgH2 | 3.18 | 3.18 | 3.18 | | |
| DT2/DT1 | 0.46 | 0.46 | 0.46 | | |
| BFL/ImgH2 | 3.10 | 3.10 | 3.10 | | |
| (N1 + N2 + N3)/3 | 1.55 | 1.55 | 1.55 | | |
| F2/R1 | −0.85 | −0.85 | −0.85 | | |
| F2/R2 | −1.08 | −1.08 | −1.08 | | |
| F2/f1 | 4.45 | 4.62 | 4.62 | | |
| F2/f2 | −7.40 | −7.79 | −7.79 | | |
| F2/f3 | 3.33 | 3.49 | 3.49 | | |
| TTL1/F1 | | | | 1.15 | 1.14 |
| ImgH1/F1 | | | | 0.97 | 0.94 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the camera apparatus described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera apparatus, comprising:
   a first optical system;
   a second optical system, sequentially from an object side to an image side of the second optical system, comprising:
   a secondary reflecting mirror;
   a main reflecting mirror having an opening in a center area thereof; and
   a lens group, wherein light from the object side is sequentially reflected by the main reflecting mirror and the secondary reflecting mirror, and then enters the lens group through the opening,
   wherein F2/F1>10, where F1 is a total effective focal length of the first optical system, and F2 is a total effective focal length of the second optical system; and
   wherein the lens group, sequentially from the main reflecting mirror to the image side along an optical axis, comprises:
   a first lens having positive refractive power;
   a second lens having negative refractive power; and
   a third lens having positive refractive power.

2. The camera apparatus according to claim 1, wherein TTL2/F2<0.5,
   where TTL2 is a distance along the optical axis from the secondary reflecting mirror to an imaging plane of the second optical system, and F2 is the total effective focal length of the second optical system.

3. The camera apparatus according to claim 1, wherein 3.0<DT1/ImgH2<3.5,
   where DT1 is an effective radius of an outer circumference of the main reflecting mirror, and ImgH2 is half of a diagonal length of an effective pixel area on an imaging plane of the second optical system.

4. The camera apparatus according to claim 1, wherein 0.2<DT2/DT1<0.5,
   where DT2 is an effective radius of the secondary reflecting mirror, and DT1 is an effective radius of an outer circumference of the main reflecting mirror.

5. The camera apparatus according to claim 1, wherein a conic coefficient of the secondary reflecting mirror and a conic coefficient of the main reflecting mirror are both less than −1.0.

6. The camera apparatus according to claim 1, wherein 3.0<BFL/ImgH2<3.5,
   where BFL is a distance along the optical axis from an image-side surface of the third lens to an imaging plane of the second optical system, and ImgH2 is half of a diagonal length of an effective pixel area on the imaging plane of the second optical system.

7. The camera apparatus according to claim 1, wherein 1.5<(N1+N2+N3)/3<1.6,
   where N1 is a refractive index of the first lens, N2 is a refractive index of the second lens, and N3 is a refractive index of the third lens.

8. The camera apparatus according to claim 1, wherein −1.0<F2/R1<−0.5,
   where F2 is the total effective focal length of the second optical system, and R1 is a radius of curvature of the main reflecting mirror.

9. The camera apparatus according to claim 1, wherein −1.2<F2/R2 <−0.9,
   where F2 is the total effective focal length of the second optical system, and R2 is a radius of curvature of the secondary reflecting mirror.

10. The camera apparatus according to claim 1, wherein 4.0<F2/f1<5.0,
    where F2 is the total effective focal length of the second optical system, and f1 is an effective focal length of the first lens.

11. The camera apparatus according to claim 1, wherein −8.0<F2/f2<−7.0,
    where F2 is the total effective focal length of the second optical system, and f2 is an effective focal length of the second lens.

12. The camera apparatus according to claim 1, wherein 3.0<F2/f3<4.0,
    where F2 is the total effective focal length of the second optical system, and f3 is an effective focal length of the third lens.

13. The camera apparatus according to claim 1, wherein the first optical system, sequentially from an object side to an image side of the first optical system along an optical axis, comprises a first lens, and at least one subsequent lens,
    wherein the first lens has positive refractive power.

14. The camera apparatus according to claim 13, wherein TTL1/F1<1.2,
- where TTL1 is a distance along the optical axis of the first optical system from an object-side surface of the first lens of the first optical system to an imaging plane of the first optical system, and F1 is the total effective focal length of the first optical system.

15. The camera apparatus according to claim 1, wherein ImgH1/F1>0.9,
- where F1 is the total effective focal length of the first optical system, and ImgH1 is half of a diagonal length of an effective pixel area on the imaging plane of the first optical system.

16. The camera apparatus according to claim 13, wherein the at least one subsequent lens comprises:
- a second lens having negative refractive power;
- a third lens,
- a fourth lens,
- a fifth lens having negative refractive power;
- a sixth lens having positive refractive power; and
- a seventh lens having negative refractive power,
- wherein the second to the seventh lenses are arranged sequentially from the first lens to the image side of the first optical system.

* * * * *